US012689190B2

(12) United States Patent
Yang

(10) Patent No.: US 12,689,190 B2
(45) Date of Patent: Jul. 21, 2026

(54) INTERLOCK MODULE, CIRCUIT BREAKER MOVEMENT UNIT AND SWITCHBOARD COMPRISING SAME

(71) Applicant: LS ELECTRIC CO., LTD., Anyang-si (KR)

(72) Inventor: Hongik Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 342 days.

(21) Appl. No.: 18/578,570

(22) PCT Filed: Jan. 5, 2022

(86) PCT No.: PCT/KR2022/000148
§ 371 (c)(1),
(2) Date: Jan. 11, 2024

(87) PCT Pub. No.: WO2023/013831
PCT Pub. Date: Feb. 9, 2023

(65) Prior Publication Data
US 2026/0121387 A1 Apr. 30, 2026

(30) Foreign Application Priority Data
Aug. 6, 2021 (KR) ........................ 10-2021-0104065

(51) Int. Cl.
*H02B 11/133* (2006.01)
*H01H 33/46* (2006.01)
(52) U.S. Cl.
CPC ........... *H02B 11/133* (2013.01); *H01H 33/46* (2013.01)

(58) Field of Classification Search
CPC .............................. H02B 11/133; H01H 33/46
See application file for complete search history.

(56) References Cited

U.S. PATENT DOCUMENTS 6,884,949 B2 4/2005 Yoon
12,500,055 B2 * 12/2025 Lee ........................ H01H 71/08

FOREIGN PATENT DOCUMENTS

CA 3125210 A1 * 7/2020 ......... H01H 71/0264
KR 200441146 Y1 7/2008
(Continued)

OTHER PUBLICATIONS

Office Action for related Korean Application No. 10-2021-0104065; action dated Apr. 10, 2023; (6 pages).
(Continued)

*Primary Examiner* — Zachary Pape
(74) *Attorney, Agent, or Firm* — K&L Gates LLP

(57) ABSTRACT
The present disclosure relates to an interlock module, a circuit breaker movement unit and a switchboard comprising same. Provided is the interlock module comprising: an outer case in which an interlock guide pin is moveable along the top surface thereof and a plurality of grooves are formed on the top surface to enable insertion of the interlock guide pin; a guide plate which is arranged inside the outer case, and which moves to the rear surface of the outer case if a handle is inserted into a handle insertion hole; and a link plate which is connected to the guide plate, and which moves toward the top surface of the outer case when the guide plate moves to the rear surface of the outer case, wherein the link plate enables the interlock guide pin to move at a height greater than or equal to that of the top surface of the outer case when moving toward the top surface of the outer case.

12 Claims, 9 Drawing Sheets

(56)     References Cited

FOREIGN PATENT DOCUMENTS

| | | | |
|---|---|---|---|
| KR | 101261968 B1 | 5/2013 | |
| KR | 101542530 B1 | 8/2015 | |
| KR | 101667258 B1 | 10/2016 | |
| KR | 101733705 B1 | 4/2017 | |
| KR | 20180005486 A * | 1/2018 | ........... H01H 71/522 |
| KR | 20180001411 U * | 5/2018 | ........... H01H 33/666 |

OTHER PUBLICATIONS

Decision of Rejection for related Korean Application No. 10-2021-0104065; action dated Oct. 24, 2023; (4 pages).

* cited by examiner (a)

(b)

(a)

(b)

INTERLOCK MODULE, CIRCUIT BREAKER MOVEMENT UNIT AND SWITCHBOARD COMPRISING SAME

CROSS-REFERENCE TO RELATED APPLICATIONS

This application is the National Stage filing under 35 U.S.C. 371 of International Application No. PCT/KR2022/000148, filed on Jan. 5, 2022, which claims the benefit of earlier filing date of and rights of priority to Korean Application 10-2021-0104065, filed on Aug. 6, 2021, the contents of which are all hereby incorporated by reference herein in their entirety.

FIELD

The present disclosure relates to an interlock module, a circuit breaker movement unit, and a switchboard including the same, and more specifically, an interlock module, a circuit breaker movement unit, and a switchboard including the same that facilitate a circuit breaker to be movable inside a switchboard case.

BACKGROUND

In general, a switchboard is a device that is installed at a power plant, a substation, or a place with an electrical utility to monitor, control, protect, etc. an electrical system.

For an operation or control of the power plant and the substation and an operation of a motor, various electric devices such as a circuit breaker, a safety device, an instrument, a display lamp, a relay, and the like are disposed within the switchboard, to facilitate opening/closing of lines or a device control.

The circuit breaker is received in a circuit breaker room of the switchboard, and may be moved to two positions, namely, a run position and a test position for use.

When the circuit breaker is moved to the rear run position inside the switchboard, a terminal disposed on the rear of the circuit breaker is connected to a terminal disposed on a rear surface of the switchboard, so that current can be supplied toward a load through a main circuit part of the circuit breaker.

When the circuit breaker is moved to the front test position inside the switchboard, the terminal disposed on the rear of the circuit breaker is separated from the terminal disposed on the rear surface of the switchboard. Accordingly, only the operation of the circuit breaker can be tested and no current is supplied to the main circuit part of the circuit breaker.

In general, a circuit breaker in a switchboard must have a basic interlock function at each of the positions. In the related art, when a handle is inserted into an interlock module, a guide plate having a curved surface moves in one direction and an interlock guide pin is raised, thereby releasing an interlock. Also, when the handle is detached from the interlock module, the guide plate having the curved surface moves in a direction opposite to the one direction, thereby performing the interlock function.

However, when the interlock guide pin is disposed on an upper surface of the guide plate other than the curved surface of the guide plate, the guide plate may not return to its original position due to pressure applied to a lower portion of the interlock guide pin even if the handle is detached. In other words, even if the handle is removed, the guide plate cannot return to its normal state, and thereby a problem in which movement and electrical operation of the circuit breaker are impossible is caused due to this return failure.

SUMMARY

Therefore, the present disclosure has been devised to solve the above problems, and an aspect of the present disclosure is to provide an interlock module, a circuit breaker movement unit, and a switchboard including the same that can facilitate an interlock guide pin to return when a handle is detached from the interlock module.

In order to achieve the above aspect, there is provided an interlock module that includes an outer case having an upper surface on which an interlock guide pin is movable, and including a plurality of grooves formed in the upper surface such which the interlock guide pin is inserted, a guide plate disposed inside the outer case and moved toward a rear surface of the outer case when a handle is inserted into a handle insertion opening, and a link plate connected to the guide plate and moved toward the upper surface of the outer case when the guide plate is moved toward the rear surface of the outer case, wherein the interlock guide pin is movable at a height equal to or higher than that of the upper surface of the outer case when the link plate is moved toward the upper surface of the outer case.

The link plate may press the interlock guide pin upward such that the interlock guide pin is adjacent to the height of the upper surface of the outer case upon the insertion of the handle in case where the interlock guide pin is inserted into one of the plurality of grooves of the outer case.

The interlock module may further include a link member connected to each of the guide plate and the link plate to allow conversion between forward and backward movement of the guide plate and vertical movement of the link plate.

The link member may include a first portion connected to the guide plate, and a second portion bent and extending from the first portion and connected to the link plate.

The first portion and the second portion of the link member may be disposed to form an angle of 60 degrees to 120 degrees with each other.

The outer case may have a guide hole into which a coupling member coupled to the link member is inserted, the link member may further include a coupling member disposed inside the outer case to fix the link member to the link member guide hole, and the link member may be moved along the link member guide hole.

The outer case may include a guide plate guide hole into which a coupling member coupled to the guide plate is inserted, and the guide plate may be disposed inside the outer case to be moved along the guide plate guide hole.

The link member guide hole may have a shape of at least a portion of a circumference, and the guide plate guide hole may have a linear shape.

The outer case may further include a stopper protruding inward to lock the guide plate in a moving direction of the guide plate when the guide plate moves in a back-and-forth direction.

The guide plate may be formed long along a longitudinal direction of the outer case, and the guide plate may further include a guide part disposed on one end thereof opposite to the handle insertion opening into which the handle is inserted, and covering at least one of the plurality of grooves of the outer case.

In order to achieve the above aspect, there is provided a circuit breaker movement unit that includes a cradle on which a circuit breaker is mounted, an interlock module disposed on a front surface of the cradle to allow movement of the circuit breaker after a handle is inserted, and an interlock guide pin pressing an outer case of the interlock module downward, wherein the interlock module includes an outer case having an upper surface on which the interlock guide pin is movable and including a plurality of grooves formed in the upper surface such that the interlock guide pin is inserted, a guide plate disposed inside the outer case and moved toward a rear surface of the outer case when the handle is inserted into a handle insertion opening, and a link plate connected to the guide plate and moved toward the upper surface of the outer case when the guide plate is moved toward the rear surface of the outer case, wherein the interlock guide pin is moved by the link plate to be movable at a height equal to or higher than that of the upper surface of the outer case.

In order to achieve the above aspect, there is provided a switchboard that includes a switchboard case having an inner space, a circuit breaker drawn into the switchboard case, and a circuit breaker movement unit configured to move the circuit breaker to a closing position, a test position, and a run position inside the switchboard case, wherein the circuit breaker movement unit includes a cradle on which a circuit breaker is mounted, an interlock module disposed on a front surface of the cradle to allow movement of the circuit breaker after a handle is inserted, and an interlock guide pin pressing an outer case of the interlock module downward, wherein the interlock module includes an outer case having an upper surface on which the interlock guide pin is movable and including a plurality of grooves formed in the upper surface such that the interlock guide pin is inserted, a guide plate disposed inside the outer case and moved toward a rear surface of the outer case when the handle is inserted into a handle insertion opening, and a link plate connected to the guide plate and moved toward the upper surface of the outer case when the guide plate is moved toward the rear surface of the outer case, wherein the interlock guide pin is moved by the link plate to be movable at a height equal to or higher than that of the upper surface of the outer case.

As described above, according to one embodiment of the present disclosure, when a handle is removed from an interlock module, a downward load is applied to a guide plate by a link member so that the guide plate can return to its original position. Accordingly, a structure of reducing a return failure of the guide plate can be provided. This can result in reducing errors in movement and electrical operation of a circuit breaker.

In an interlock module according to one embodiment of the present disclosure, a guide plate may include a guide part and move along an outer case while covering an upper surface of the outer case. Accordingly, the guide part can be stably moved back and forth when the guide plate is moved back and forth.

According to one embodiment of the present disclosure, as an outer case is provided with a stopper that locks a guide plate, malfunction that may occur due to excessive movement of the guide plate can be suppressed.

DETAILED DESCRIPTION

Hereinafter, embodiments of the present disclosure will be described in detail with reference to the accompanying drawings, so as to be easily implemented by those skilled in the art.

In the following description, a description of some components will be omitted to clarify the features of the present disclosure.

The term "electrical connection" used in the following description refers to that current or an electrical signal is transmitted between one or more members.

The term "switchboard or distribution board" used in the following description refers to a device in which switches, instruments, relays, etc. are fixedly inserted and managed. On a front surface of the switchboard may be disposed an operating lever that opens and closes a circuit breaker of a high-voltage main circuit, an air switch (air circuit breaker) of a low-voltage main circuit, a voltmeter, an ammeter, a power meter, an integrated power meter, an eddy current relay, etc. may be placed.

The term "circuit breaker" used in the following description refers to a vacuum circuit breaker. In other words, a vacuum circuit breaker refers to a circuit breaker configured to block current on a power supply line in a hermetic space in a vacuum state. Each configuration described below is assumed to be applied to an air circuit breaker.

However, each configuration described below may also be applied to air blast circuit breakers, compressed air circuit breakers, gas circuit breakers, oil circuit breakers, and vacuum circuit breakers.

Figure 1:
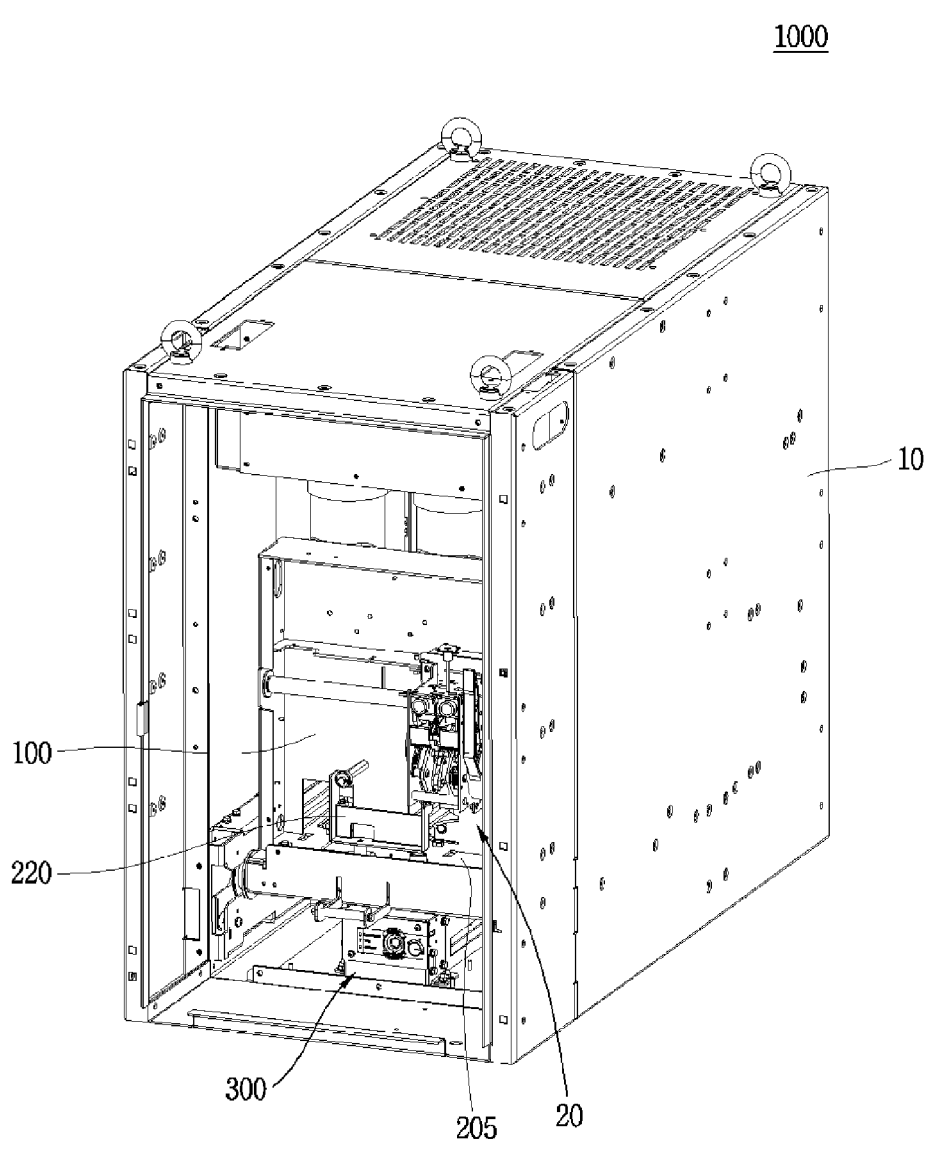
FIGS. 1, 2 and 3 are perspective views illustrating a circuit breaker and an interlock module disposed inside a switchboard in accordance with one embodiment of the present disclosure.
Figure 2:
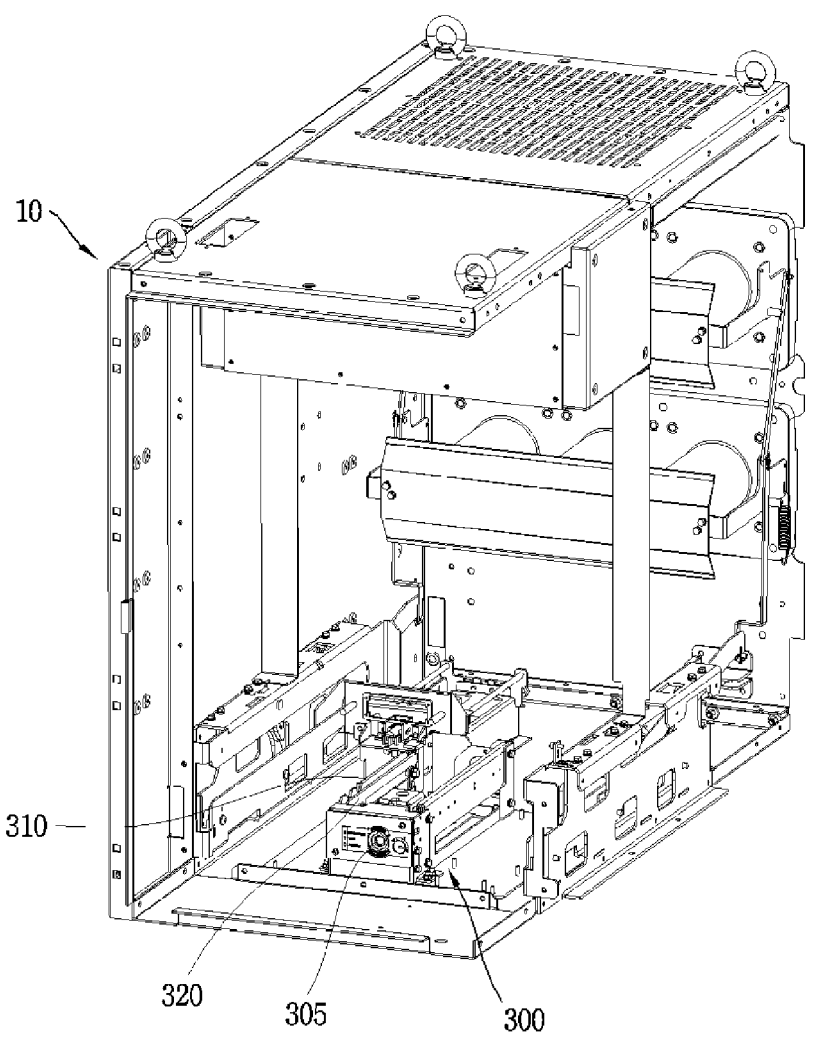
Figure 3:
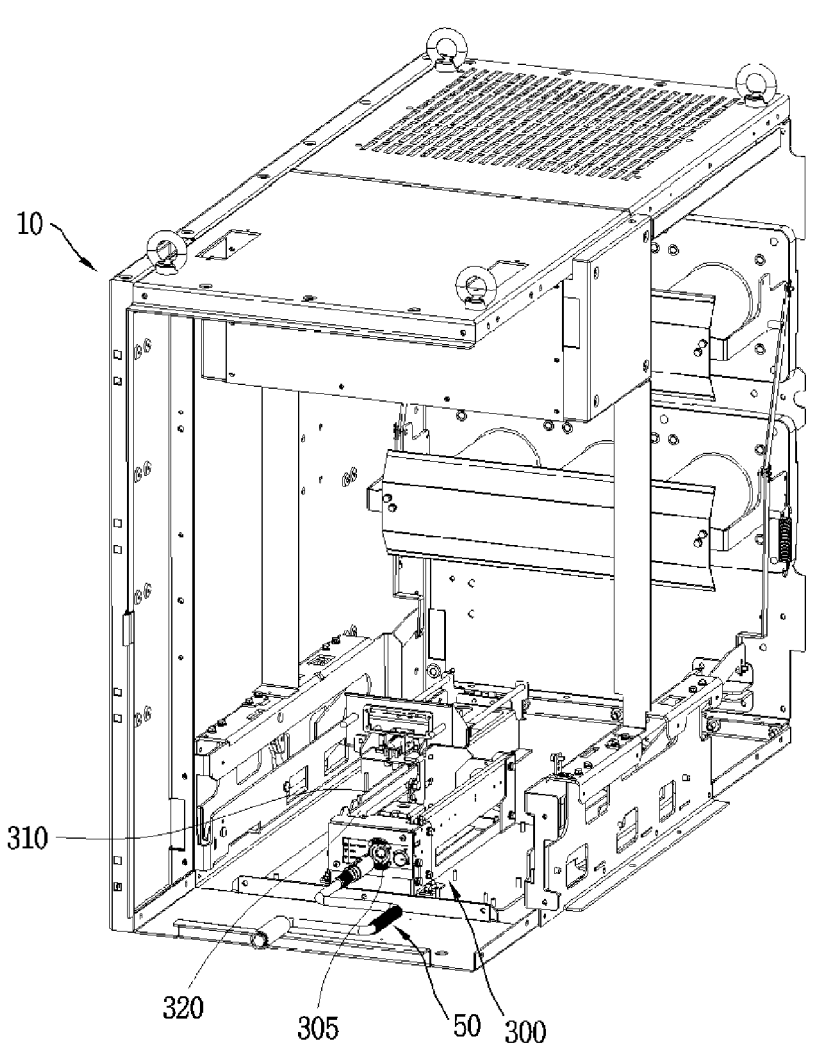
Figure 4:
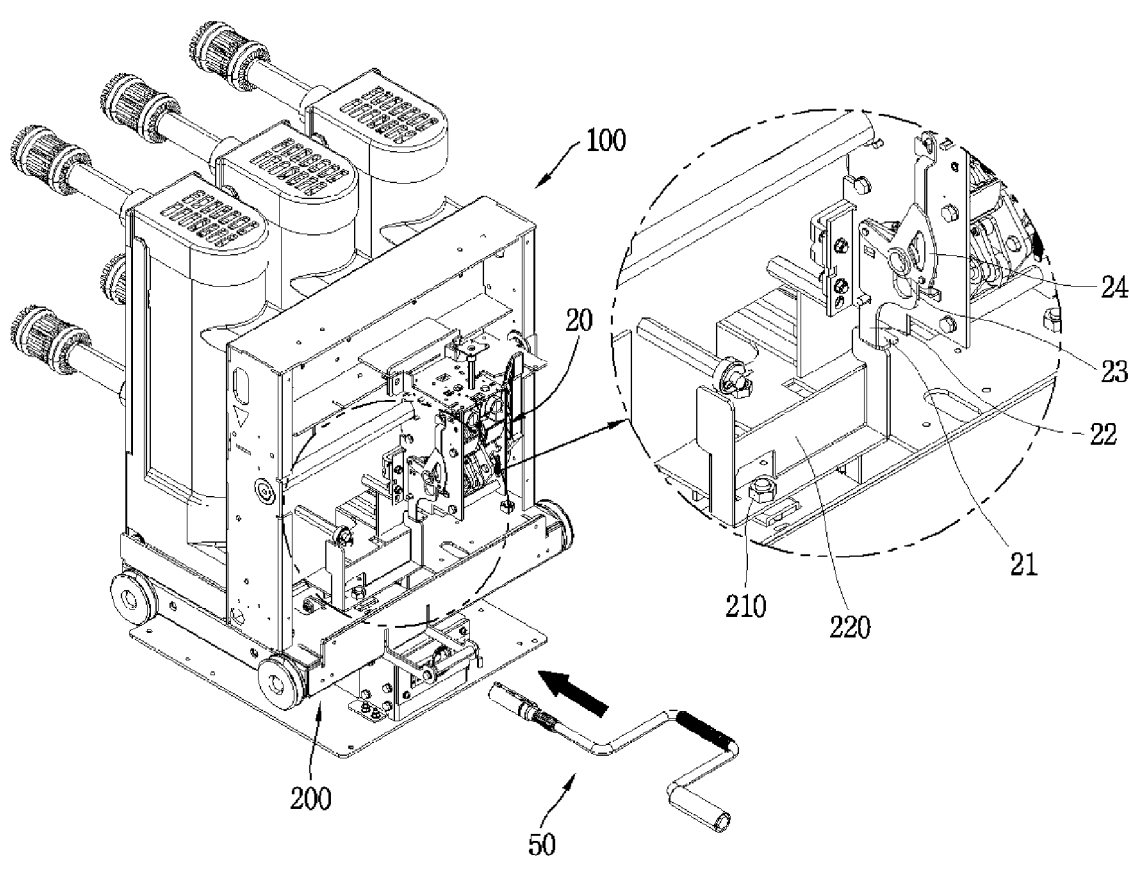
FIG. 4 is a perspective view illustrating a circuit breaker and a state before inserting a handle into a circuit breaker movement unit in accordance with one embodiment of the present disclosure.
Figure 5:
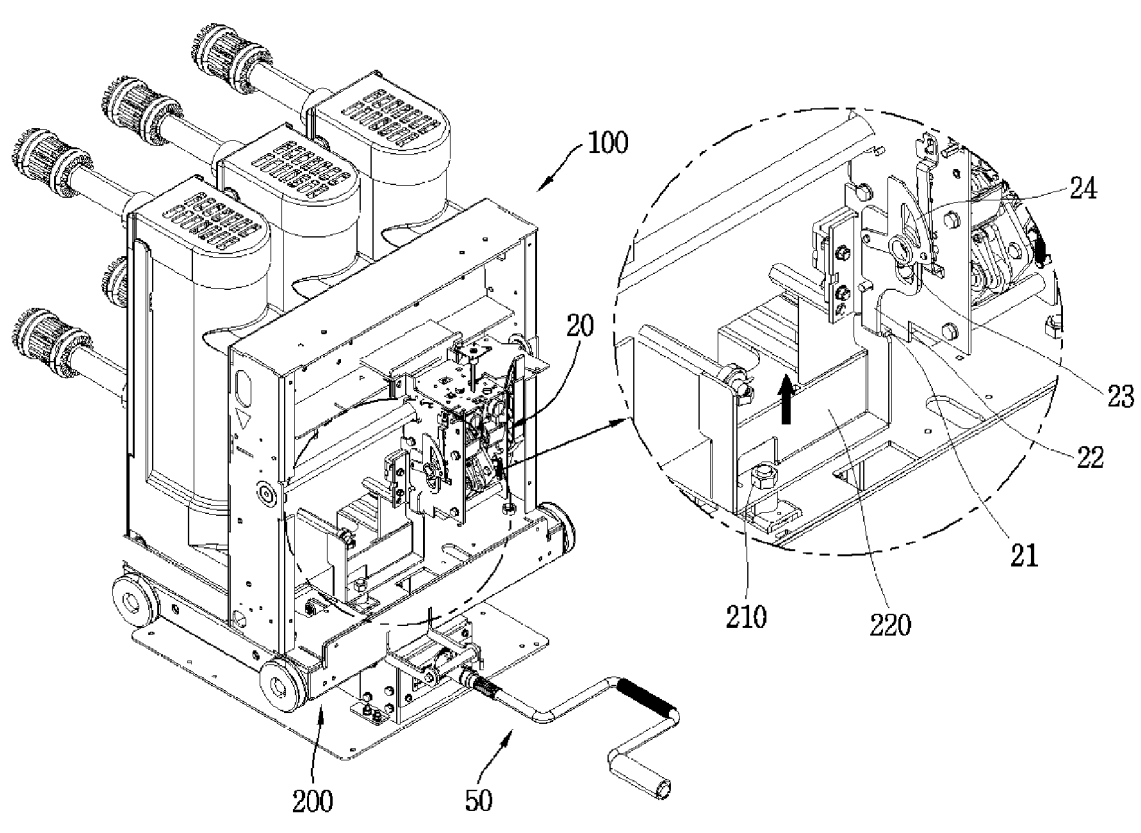
FIG. 5 is a perspective view illustrating a circuit breaker and a state after inserting a handle into a circuit breaker movement unit in accordance with one embodiment of the present disclosure.
Figure 6:
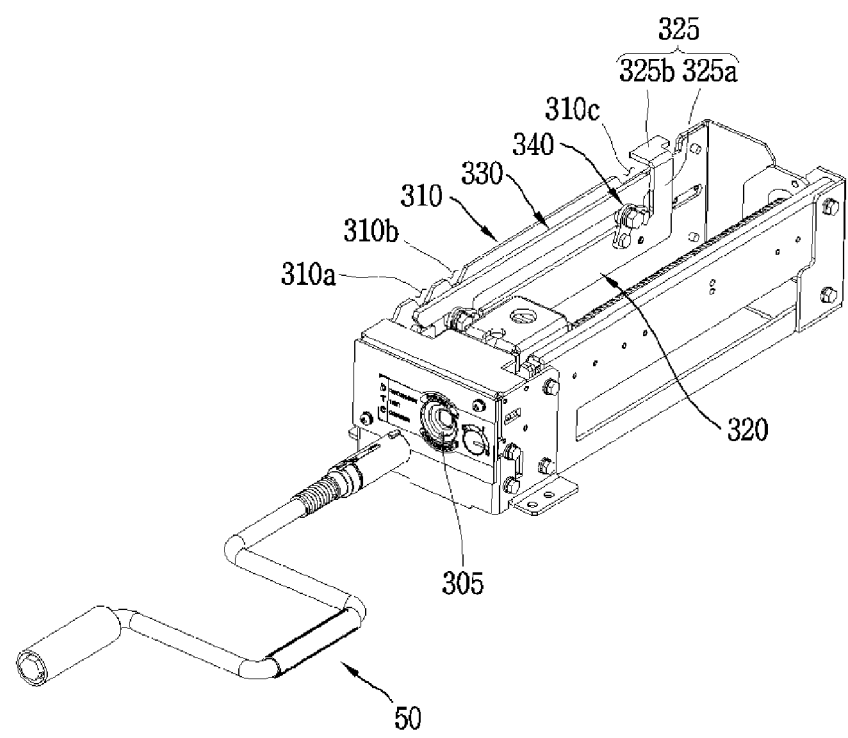
FIGS. 6 to 8 are perspective views illustrating an interlock module in accordance with one embodiment of the present disclosure.
Figure 7:
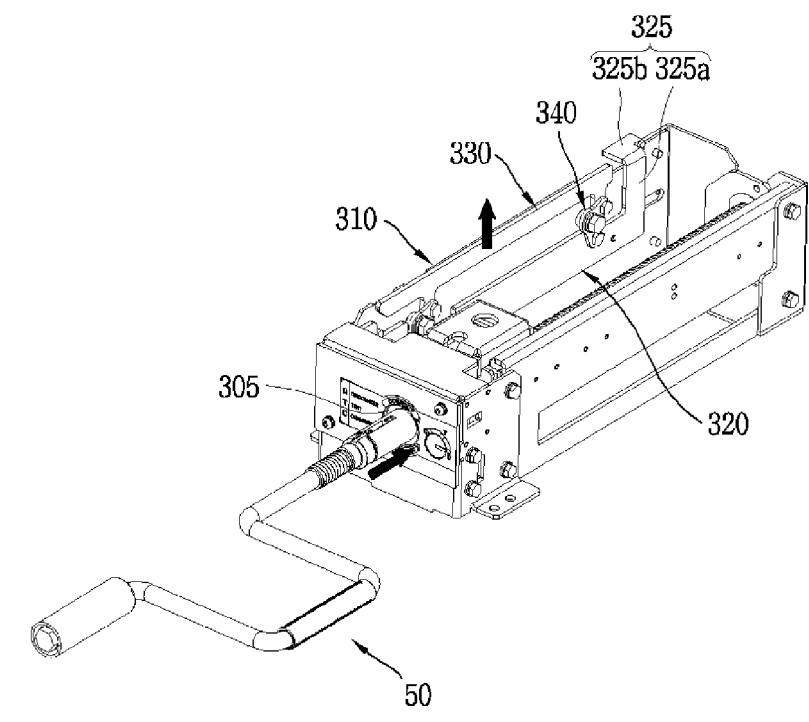
Figure 8:
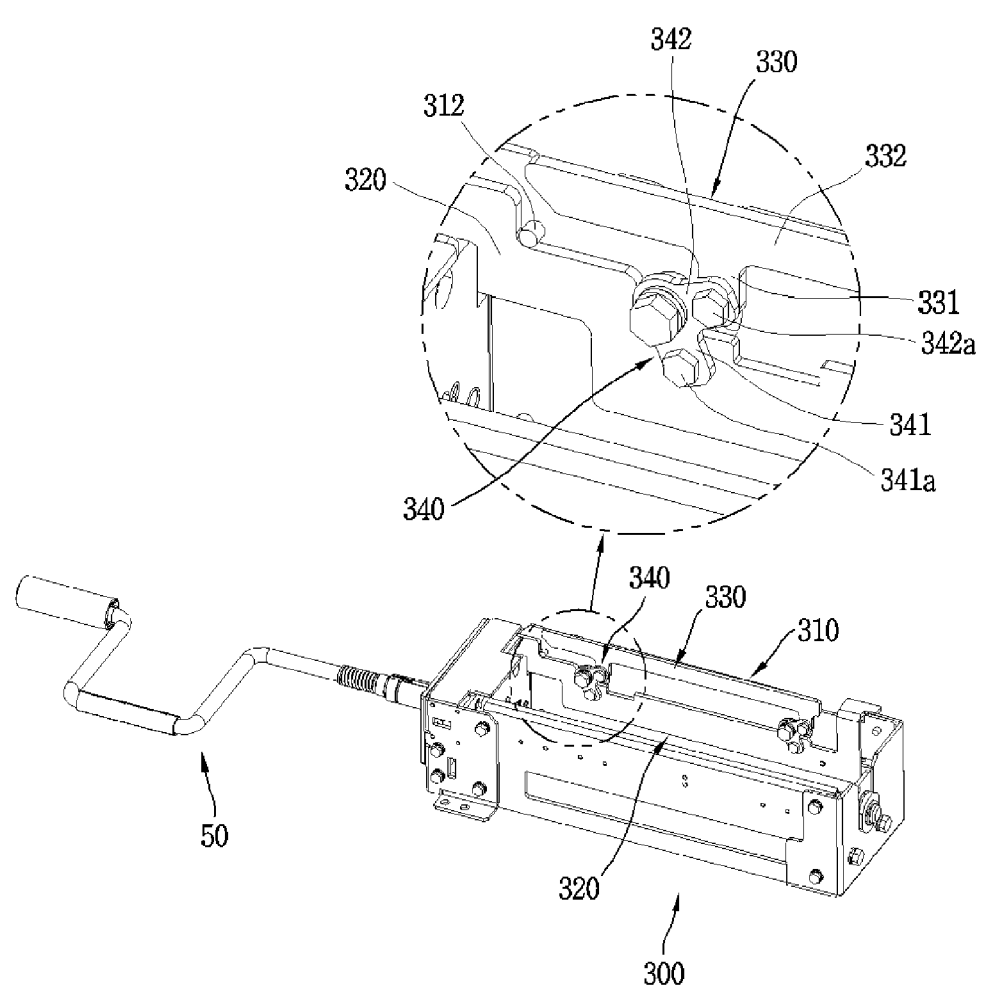
Figure 9:
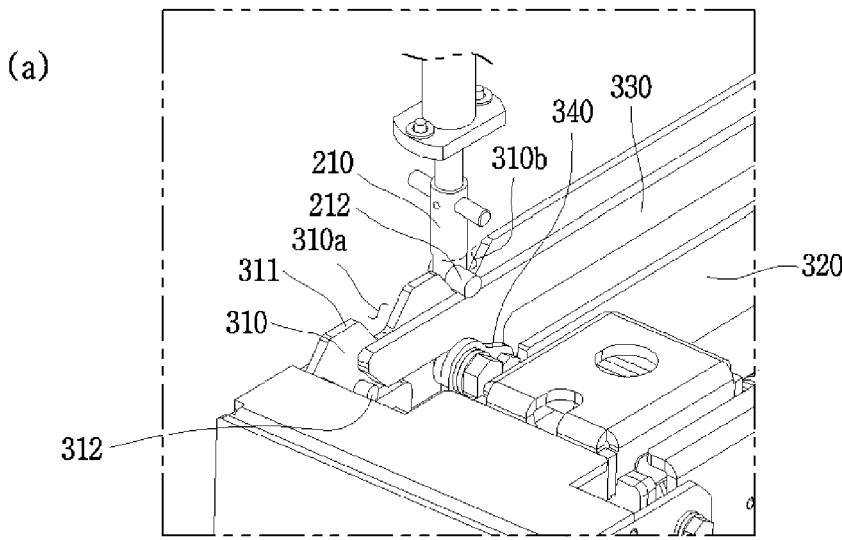
FIG. 9 is a partial perspective view illustrating that an interlock guide pin is inserted into a groove of an outer case in FIG. 6.
Figure 9:
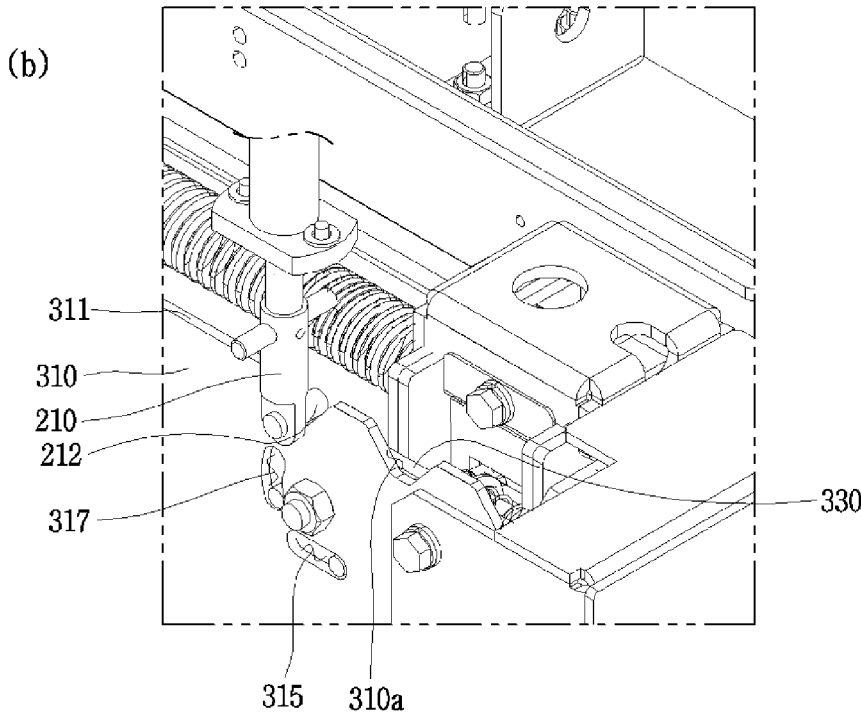
Figure 10:
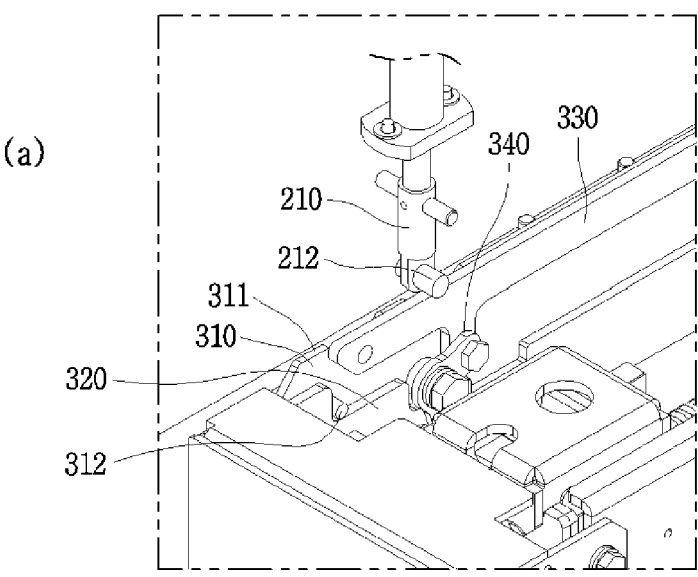
FIG. 10 is a partial perspective view illustrating that an interlock guide pin moves along an upper surface of an outer case in FIG. 8.
Figure 10:
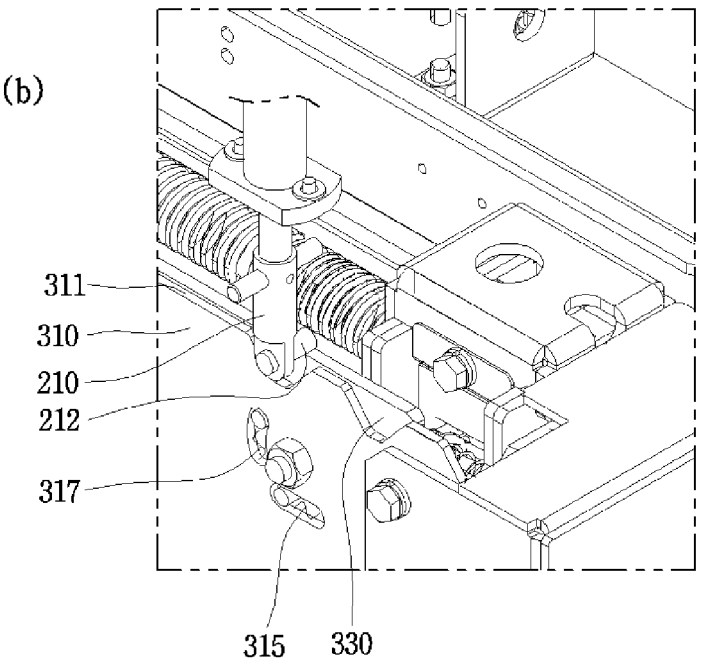

FIGS. 1, 2 and 3 are perspective views illustrating a circuit breaker and an interlock module disposed inside a switchboard in accordance with one embodiment of the present disclosure. FIG. 4 is a perspective view illustrating a circuit breaker and a state before inserting a handle into a circuit breaker movement unit in accordance with one embodiment of the present disclosure. FIG. 5 is a perspective view illustrating a circuit breaker and a state after inserting a handle into a circuit breaker movement unit in accordance with one embodiment of the present disclosure. FIGS. 6 to 8 are perspective views illustrating an interlock module in accordance with one embodiment of the present disclosure. FIG. 9 is a partial perspective view illustrating that an interlock guide pin is inserted into a groove of an outer case in FIG. 6. FIG. 10 is a partial perspective view illustrating that an interlock guide pin moves along an upper surface of an outer case in FIG. 8.

A switchboard 1000 according to one embodiment of the present disclosure may include a switchboard case 10, a circuit breaker 100, and a circuit breaker movement unit 200.

The switchboard case 10 may have an inner space in which the circuit breaker 100 and the circuit breaker movement unit 200 can be received. A main circuit introduced from outside is disposed on a rear surface of the switchboard case 10.

The circuit breaker 100 is configured to be drawn into the switchboard case 10. The circuit breaker 100 is a device that selectively closes (ON) or opens (OFF) a line between a power source side (main circuit) and a load side to block the line upon an occurrence of overload, short-circuit, electric leakage, or electric shock.

The circuit breaker movement unit 200 allows the circuit breaker 100 to be movable to a closing position, a test position, and a run position inside the switchboard case 10.

The circuit breaker movement unit 200 according to one embodiment of the present disclosure includes a cradle 205, an interlock module 300, and an interlock guide 210.

The circuit breaker 100 is mounted to the cradle 205. The circuit breaker 100 may be electrically connected to the cradle 205 at the test position and the run position.

Specifically, the circuit breaker 100 may be separated from terminals of the cradle 205 and disposed at a test position at which only the operation of the circuit breaker 100 is tested. In addition, the circuit breaker 100 may be disposed at a run position where a bus bar and a load terminal of the circuit breaker 100 are connected to a bus bar and a load terminal of the cradle 205 to supply voltage and current.

The interlock module 300 is placed on a front surface of the cradle 205, and allows the circuit breaker 100 to move after a handle is inserted. That is, the circuit breaker 100 on the cradle 205 is not moved to the front or rear surface of the switchboard case 10 before the handle is inserted into interlock module 300.

The interlock guide 210 includes an interlock guide pin 212. The interlock guide pin 212 is configured to press downward the outer case 310 of the interlock module 300. Specifically, referring to FIGS. 9 and 10, the interlock guide pin 212 is formed in a direction of pressing an outer case upper surface 311 downward. Accordingly, the interlock guide pin 212 may be inserted into a plurality of grooves of the outer case 310 when a link plate 330 is not moved upward.

Hereinafter, the interlock module 300 and a mechanism assembly 20 (interlock drive unit) inside the circuit breaker 100 before and after a handle is inserted into the interlock module 300 will be described, with reference to FIGS. 4 and 5.

Specifically, when the handle 50 is inserted into the interlock module 300, the interlock guide 210 is moved upward. And, as the interlock guide 210 is moved upward, the interlock plate 220 is raised. At this time, as the interlock plate 220 and a lower link linkage portion 21 are moved, a lower link 22 and an upper link 24 are operated. Accordingly, an upper link rotation portion 23 may be rotated. This implements an interlock release operation of the circuit breaker 100.

The interlock module 300 according to one embodiment of the present disclosure includes an outer case 310, a guide plate 320, and a link plate 330.

<Outer Case 310>

The interlock guide pin 212 is movable along an upper (or top) surface of the outer case 310, and a plurality of grooves in which the interlock guide pin 212 can be inserted are formed in the upper surface of the outer case 310.

Referring to FIG. 6, the outer case 310 may include a first groove 310a, a second groove 310b, and a third groove

310c. And, the interlock guide pin 212 may be inserted into the first groove 310a, the second groove 310b, and the third groove 310c.

Specifically, the interlock guide pin 212 may be movable along the upper surface of the outer case 310. At this time, when the link plate 330 is not moved upward, the interlock guide pin 212 may be inserted into the first groove 310a, the second groove 310b, and the third groove 310c.

When the interlock guide pin 212 is inserted into the first groove 310a, the circuit breaker 100 may be in a closed state. That is, it is an initial state when the circuit breaker 100 is introduced into the switchboard case 10.

When the interlock guide pin 212 is inserted into the second groove 310b, the circuit breaker 100 may be located at a test position. That is, the circuit breaker 100 is in a state to be tested.

When the interlock guide pin 212 is inserted into the third groove 310c, the circuit breaker 100 may be located at a run position.

The interlock module 300 needs to fix the circuit breaker 100 to the closed state (closing position), the test position, and the run position. Accordingly, the interlock guide pin 212 may press the outer case 310 of the interlock module 300, and the position of the circuit breaker may be fixed by the first groove 310a, the second groove 310b, and the third groove 310c which are formed in the outer case 310.

<Guide Hole of Outer Case 310>

Meanwhile, the outer case 310 may be provided with a link member guide hole 317 into which a coupling member coupled to a link member 340 can be inserted. Specifically, referring to FIGS. 9 and 10, the link member guide hole 317 into which the coupling member coupled to the link member 340 can be inserted may be formed in the outer case 310.

Also, the outer case 310 may be provided with a guide plate guide hole 315 into which a coupling member coupled to the guide plate 320 can be inserted. Specifically, referring to FIG. 10, the guide plate guide hole 315 into which the coupling member coupled to the guide plate 320 can be inserted may be formed in the outer case 310.

At this time, the link member guide hole 317 formed in the outer case 310 may have a shape corresponding to at least a portion of a circumference, and the guide plate guide hole 315 may have a linear shape.

When the handle is inserted into the interlock module 300, the guide plate 320 moves linearly in a back-and-forth direction, and the link plate 330 moves in a circumferential direction. Therefore, the link member guide hole 317 may have a shape corresponding to at least a portion of a circumference and the guide plate guide hole 315 may have a linear shape.

<Stopper 312>

Referring to FIG. 10, the outer case 310 may further include a stopper 312 that protrudes inward to lock the guide plate 320 in a moving direction of the guide plate 320 when the guide plate 320 moves back and forth.

According to one embodiment of the present disclosure, as the outer case 310 is provided with the stopper 312 that locks the guide plate 320, malfunction that may occur due to excessive movement of the guide plate 320 can be suppressed.

<Guide Plate 320>

The guide plate 320 is disposed inside the outer case 310. The guide plate 320 may be disposed adjacent to the outer case 310.

The guide plate 320 is moved toward the rear surface of the outer case 310 when the handle is inserted into a handle insertion opening 305 of the interlock module 300. At this time, the guide plate 320 may be moved in the back-and-forth direction along the guide plate guide hole 315.

That is, the guide plate 320 is moved toward the rear surface when the handle is inserted into the interlock module 300, and returns toward the front surface when the handle is removed from the interlock module 300.

<Guide Plate 320—Guide Part 325>

Referring to FIG. 7, the guide plate 320 may be formed to be long along a longitudinal direction of the outer case 310.

At this time, the guide plate 320 may further include a guide part 325 that is disposed on one end opposite to the handle insertion opening 305 into which the handle is inserted, and surrounds at least one of the plurality of grooves of the outer case 310.

Specifically, the guide part 325 may include a vertical extension portion 325a that extends toward the upper surface of the outer case 310 and a guide cover portion 325b that covers a portion of the plurality of grooves of the outer case 310.

In the interlock module 300 according to one embodiment of the present disclosure, the guide plate 320 may include the guide part 325 and move along the outer case 310 while covering the upper surface of the outer case 310. Accordingly, the guide part 325 can be stably moved back and forth when the guide plate 320 is moved back and forth.

<Link Plate 330>

The link plate 330 is connected to the guide plate 320, and moved toward the upper surface of the outer case 310 when the guide plate 320 moves toward the rear surface of the outer case 310. The link plate 330 may include a connection portion 331 connected to the link member 340, and a plate portion 332 that is formed long to correspond to the outer case 310.

Specifically, FIG. 6 illustrates a state before the handle is inserted into the interlock module 300, and FIG. 7 illustrates a state after the handle is inserted into the interlock module 300.

First, referring to FIG. 6, the guide plate 320 is not moved to the rear surface before the handle is inserted into the interlock module 300. That is, the guide plate 320 is disposed on a front side—a side close to the handle insertion opening 305 inside the outer case 310. Additionally, the link plate 330 may be disposed such that the upper surface of the link plate 330 is located on the same surface as an upper surface of the groove of the outer case 310. That is, the link plate 330 is disposed by being drawn in the outer case 310.

Next, referring to FIG. 7, when the handle is inserted into the interlock module 300, the guide plate 320 is moved toward the rear surface inside the outer case 310. That is, the guide plate 320 is moved toward the rear surface—away from the handle insertion opening 305 inside the outer case 310. Additionally, the link plate 330 is moved upward such that the upper surface of the link plate 330 is located on the same surface as the upper surface of the outer case 310.

At this time, when the link plate 330 moves toward the upper surface of the outer case 310, the interlock guide pin 212 may be movable along the upper surface of the outer case 310.

Specifically, the interlock guide pin 212 of the interlock guide 210 is disposed to move in contact with the upper surface of the outer case 310. However, referring to FIG. 9, as described above, in the state that the link plate 330 is not raised, the interlock guide 210 is inserted into the plurality of grooves of the outer case 310 so as not to be moved back and forth.

However, referring to FIG. 10, when the link plate 330 is moved upward, the interlock guide pin 212 of the interlock guide 210 may be pushed up by the upper surface of the upwardly-moved link plate 330. Accordingly, the interlock guide pin 212 is movable along the upper surface of the outer case 310. However, the interlock guide pin 212 may also be moved along the upper surface of the link plate 330. Additionally, the interlock guide pin 212 may be moved along the upper surface of the outer case 310 and the upper surface of the link plate 330.

That is, when the interlock guide pin 212 is inserted into one of the plurality of grooves of the outer case 310, the link plate 330 pushes upward the interlock guide pin 212 such that the interlock guide pin 212 is adjacent to a height of the upper surface of the outer case 310 when the handle is inserted.

<Link Member 340>

The interlock module 300 according to one embodiment of the present disclosure may further include a link member 340.

The link member 340 may be connected to each of the guide plate 320 and the link plate 330, and may lead the conversion between the forward and backward movement of the guide plate 320 and the up and down (vertical) movement of the link plate 330.

Specifically, referring to FIG. 8, the link member 340 may include a first portion 341 connected to the guide plate 320, and a second portion 342 bent and extending from the first portion 341 and connected to the link plate 330.

The first portion 341 may have a first portion coupling member 341a through which the link member 340 and the guide plate 320 are coupled to each other. Additionally, the first portion coupling member 341a may be coupled through the guide plate guide hole 315 of the outer case 310, so as to guide a movement path of the guide plate 320 upon insertion of the handle.

The second portion 342 may have a second portion coupling member 342a through which the link member 340 and the link plate 330 are coupled to each other. Additionally, the second portion coupling member 342a may penetrate through the link member guide hole 317 of the outer case 310, so as to guide a movement path of the link plate 330.

When the handle is inserted into the interlock module 300 and the guide plate 320 is moved to the rear surface, the link member 340 connected to the guide plate 320 and the link plate 330 is rotated. As the link member 340 is rotated, the link plate 330 received inside the outer case 310 may be moved toward the upper surface of the outer case 310.

According to one embodiment of the present disclosure, a rotation angle of the link member 340 may be limited by the stopper 312 formed on the outer case 310. By limiting the rotation angle of the link member 340, the height by which the link plate 330 is raised can be adjusted.

At this time, the first portion 341 and the second portion 342 of the link member 340 may be disposed to form an angle of 60 degrees to 120 degrees. Specifically, referring to FIG. 8, the first portion 341 and the second portion 342 of the link member 340 are preferably disposed to form the angle of 60 to 120 degrees.

The link member 340 may serve to convert the linear movement of the guide plate 320 into the up and down (vertical) movement of the link plate 330. However, when the angle formed by the first portion 341 and the second portion 342 of the link member 340 is less than 60 degrees or greater than 120 degrees, it is difficult to effectively convert the linear movement of the guide plate 320 into the up and down movement of the link plate 330.

The link member 340 may further include a second portion coupling member 342a disposed inside the outer case 310 to fix the link member 340 to the link member guide hole 317. And, the link member 340 may be moved along the link member guide hole 317.

So far, the embodiment of the present disclosure has been described. However, the scope of the present disclosure is not limited to the above-described embodiment, and various modifications and variations are made by those skilled in the art using the basic concept of the present disclosure as defined in the appended claims, without departing from the scope of the present disclosure.

DESCRIPTION OF REFERENCE NUMERALS

1000 Switchboard
10 Switchboard case
20 Mechanism assembly
21 Lower link linkage portion
22 Lower link
23 Upper link rotation portion
24 Upper link
100 Circuit breaker
200 Circuit breaker movement unit
205 Cradle
210 Interlock guide
212 Interlock guide pin
220 Interlock plate
300 Interlock module
305 Handle insertion opening
310 Outer Case
311 Outer case upper surface
310a First groove
310b Second groove
310c Third groove
312 Stopper
315 Guide plate guide hole
317 Link member guide hole
320 Guide plate
325 Guide part
325a Vertical extension portion
325b Guide cover portion
330 Link plate
331 connection portion
332 Plate portion
340 Link member
341 First portion
341a First portion coupling member
342 Second portion
342a Second portion coupling member

The invention claimed is:

1. An interlock module comprising:
an outer case having an upper surface on which an interlock guide pin is movable, and including a plurality of grooves formed in the upper surface such that the interlock guide pin is inserted;
a guide plate disposed inside the outer case and moved toward a rear surface of the outer case when a handle is inserted into a handle insertion opening; and
a link plate connected to the guide plate and moved toward the upper surface of the outer case when the guide plate is moved toward the rear surface of the outer case,
wherein the interlock guide pin is movable at a height equal to or higher than that of the upper surface of the outer case when the link plate is moved toward the upper surface of the outer case.

2. The interlock module of claim 1, wherein the link plate presses the interlock guide pin upward such that the interlock guide pin is adjacent to the height of the upper surface of the outer case upon the insertion of the handle in a case where the interlock guide pin is inserted into one of the plurality of grooves of the outer case.

3. The interlock module of claim 2, further comprising a link member connected to each of the guide plate and the link plate to allow conversion between forward and backward movement of the guide plate and vertical movement of the link plate.

4. The interlock module of claim 3, wherein the link member comprises:
a first portion connected to the guide plate; and
a second portion bent and extending from the first portion and connected to the link plate.

5. The interlock module of claim 4, wherein the first portion and the second portion of the link member are disposed to form an angle of 60 degrees to 120 degrees with each other.

6. The interlock module of claim 5, wherein the outer case has a guide hole into which a coupling member coupled to the link member is inserted,
the link member further comprises a coupling member disposed inside the outer case to fix the link member to the link member guide hole, and
the link member is moved along the link member guide hole.

7. The interlock module of claim 6, wherein the outer case comprises a guide plate guide hole into which a coupling member coupled to the guide plate is inserted, and
the guide plate is disposed inside the outer case to be moved along the guide plate guide hole.

8. The interlock module of claim 7, wherein the link member guide hole has a shape of at least a portion of a circumference, and the guide plate guide hole has a linear shape.

9. The interlock module of claim 3, wherein the outer case further comprises a stopper protruding inward to lock the guide plate in a moving direction of the guide plate when the guide plate moves in a back-and-forth direction.

10. The interlock module of claim 9, wherein the guide plate is formed along a longitudinal direction of the outer case, and
the guide plate further comprises a guide part disposed on one end thereof opposite to the handle insertion opening into which the handle is inserted, and covering at least one of the plurality of grooves of the outer case.

11. A circuit breaker movement unit comprising:
a cradle on which a circuit breaker is mounted;
an interlock module disposed on a front surface of the cradle to allow movement of the circuit breaker after a handle is inserted; and
an interlock guide pin pressing an outer case of the interlock module downward,
wherein the interlock module comprises:
the outer case having an upper surface on which the interlock guide pin is movable and including a plurality of grooves formed in the upper surface such that the interlock guide pin is inserted;
a guide plate disposed inside the outer case and moved toward a rear surface of the outer case when the handle is inserted into a handle insertion opening; and
a link plate connected to the guide plate and moved toward the upper surface of the outer case when the guide plate is moved toward the rear surface of the outer case, and wherein the interlock guide pin is moved by the link plate to be movable at a height equal to or higher than that of the upper surface of the outer case.

12. A switchboard comprising:

a switchboard case having an inner space;

a circuit breaker drawn into the switchboard case; and a circuit breaker movement unit configured to move the circuit breaker to a closing position, a test position, and a run position inside the switchboard case, wherein the circuit breaker movement unit comprises:

a cradle on which the circuit breaker is mounted;

an interlock module disposed on a front surface of the cradle to allow movement of the circuit breaker after a handle is inserted; and an interlock guide pin pressing an outer case of the interlock module downward, wherein the interlock module comprises:

the outer case having an upper surface on which the interlock guide pin is movable and including a plurality of grooves formed in the upper surface such that the interlock guide pin is inserted;

a guide plate disposed inside the outer case and moved toward a rear surface of the outer case when the handle is inserted into a handle insertion opening; and a link plate connected to the guide plate and moved toward the upper surface of the outer case when the guide plate is moved toward the rear surface of the outer case, wherein the interlock guide pin is moved by the link plate to be movable at a height equal to or higher than that of the upper surface of the outer case.

\* \* \* \* \*